United States Patent [19]

Priest

[11] Patent Number: 4,877,956
[45] Date of Patent: Oct. 31, 1989

[54] CLOSED FEEDBACK INJECTION SYSTEM FOR RADIOACTIVE MATERIALS USING A HIGH PRESSURE RADIOACTIVE SLURRY INJECTOR

[75] Inventor: Mark A. Priest, Duncan, Okla.

[73] Assignee: Halliburton Company, Duncan, Okla.

[21] Appl. No.: 210,257

[22] Filed: Jun. 23, 1988

[51] Int. Cl.[4] .............................................. G01V 5/00
[52] U.S. Cl. ...................................... 250/259; 250/260
[58] Field of Search .................. 250/260, 259; 417/42; 222/43, 47, 55, 63

[56] References Cited

U.S. PATENT DOCUMENTS

| | | | |
|---|---|---|---|
| 1,323,116 | 11/1919 | Stott | 222/387 |
| 2,163,436 | 6/1939 | Raymond et al. | 137/209 |
| 2,884,067 | 4/1959 | Marken | 166/75.1 |
| 3,010,023 | 11/1961 | Egan et al. | 250/303 |
| 3,228,472 | 1/1966 | Rhoads, Jr. | 166/64 |
| 3,493,757 | 2/1970 | Glenn, Jr. | 250/493.1 |
| 4,064,936 | 12/1977 | McClure | 166/75.1 |
| 4,092,546 | 5/1978 | Larrabee | 250/515.1 |
| 4,199,680 | 4/1980 | Moon | 250/260 |
| 4,200,804 | 4/1980 | Farella et al. | 250/506.1 |
| 4,574,880 | 3/1986 | Handke | 166/75.1 |
| 4,659,925 | 4/1987 | Burbridge et al. | 250/260 |
| 4,712,618 | 12/1987 | Handke et al. | 166/308 |
| 4,718,576 | 1/1988 | Tamura et al. | 222/63 |
| 4,747,060 | 5/1988 | Sears, III et al. | 364/481 |
| 4,751,648 | 6/1988 | Sears, III et al. | 364/422 |
| 4,786,805 | 11/1988 | Priest | 250/260 |
| 4,799,552 | 1/1989 | Acree | 166/305.1 |

Primary Examiner—Constantine Hannaher
Attorney, Agent, or Firm—Mark E. McBurney

[57] ABSTRACT

A closed feedback control system for injecting radioactive material into a high pressure well stimulation fluid line is provided which allows the injection rate to be controlled based upon desired and actual values. A controller calculates a desired injection rate based upon job characteristics, compares the desired rate, and then uses a PID algorithm to control the injection rate until the actual and desired rates are equal. Additionally, the injection system is controllable by a manual control device affixed to the previously mentioned controller, or by utilizing a separate manual control unit.

20 Claims, 7 Drawing Sheets

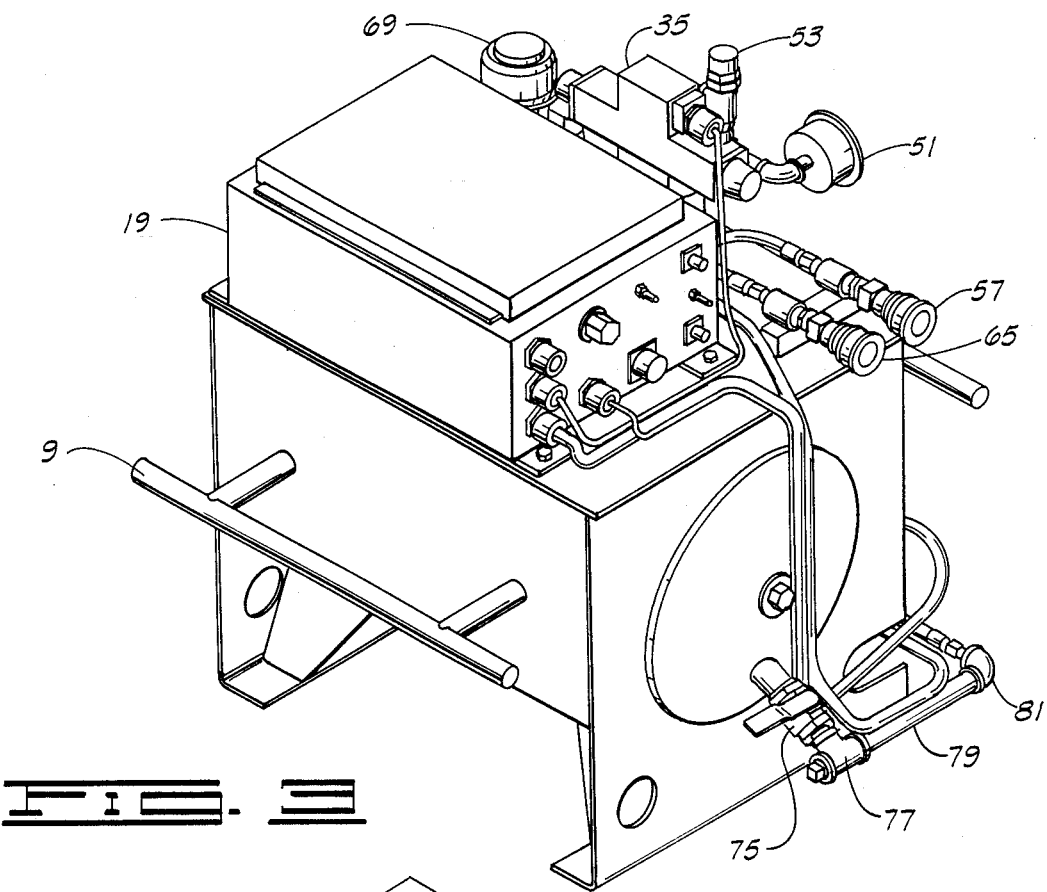
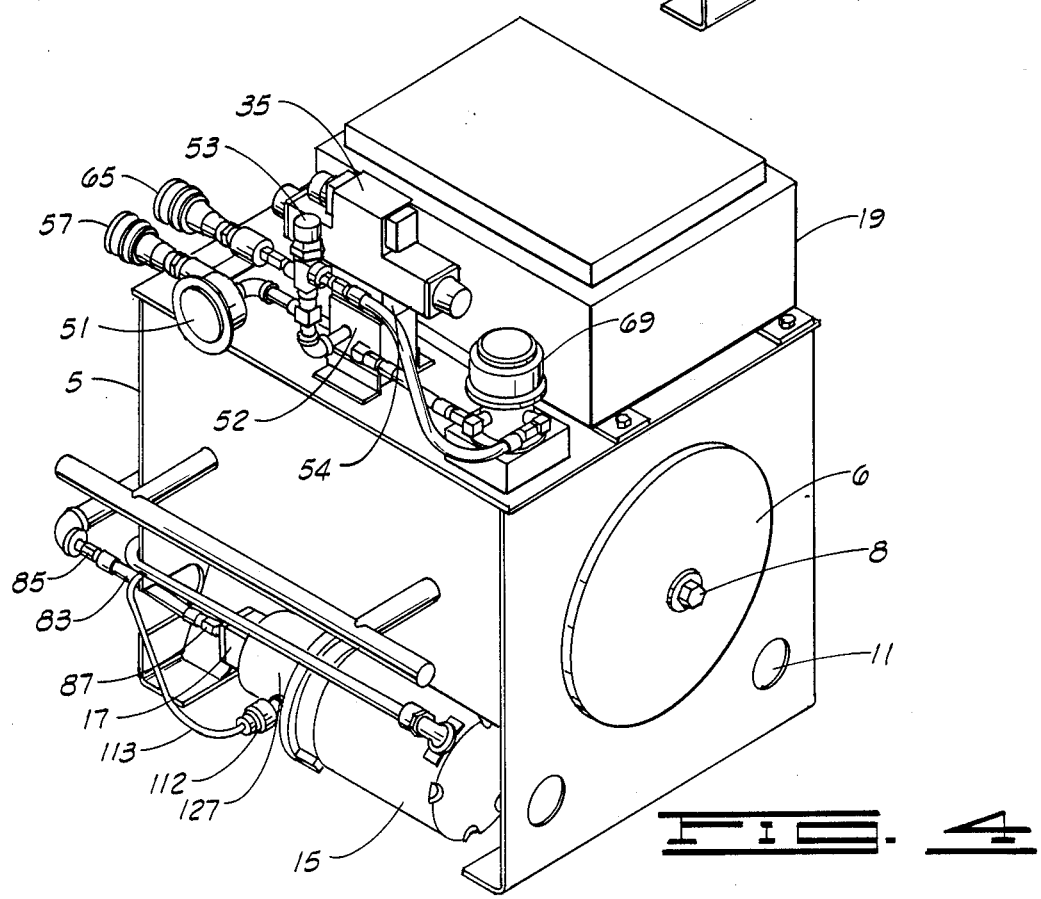

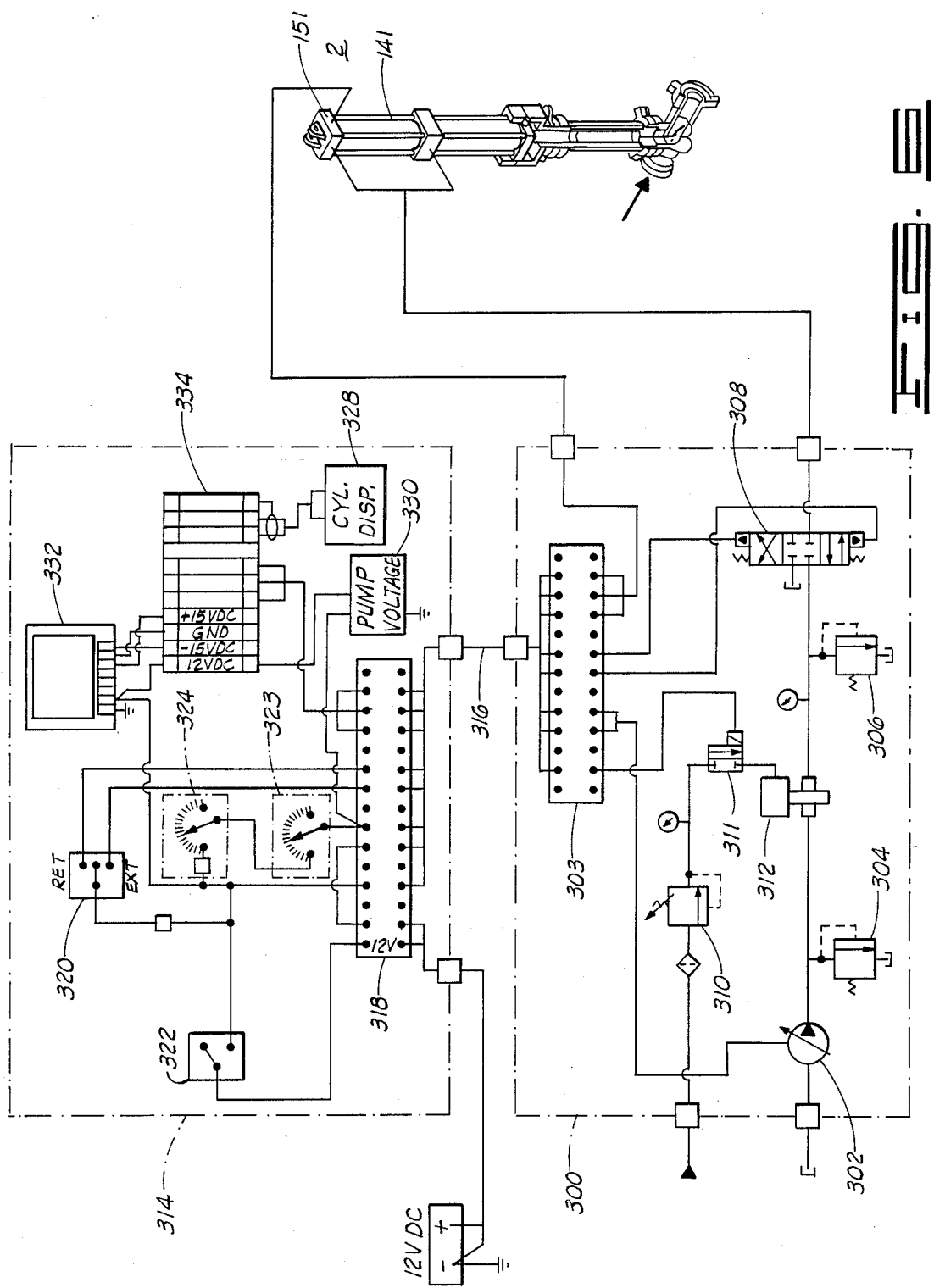

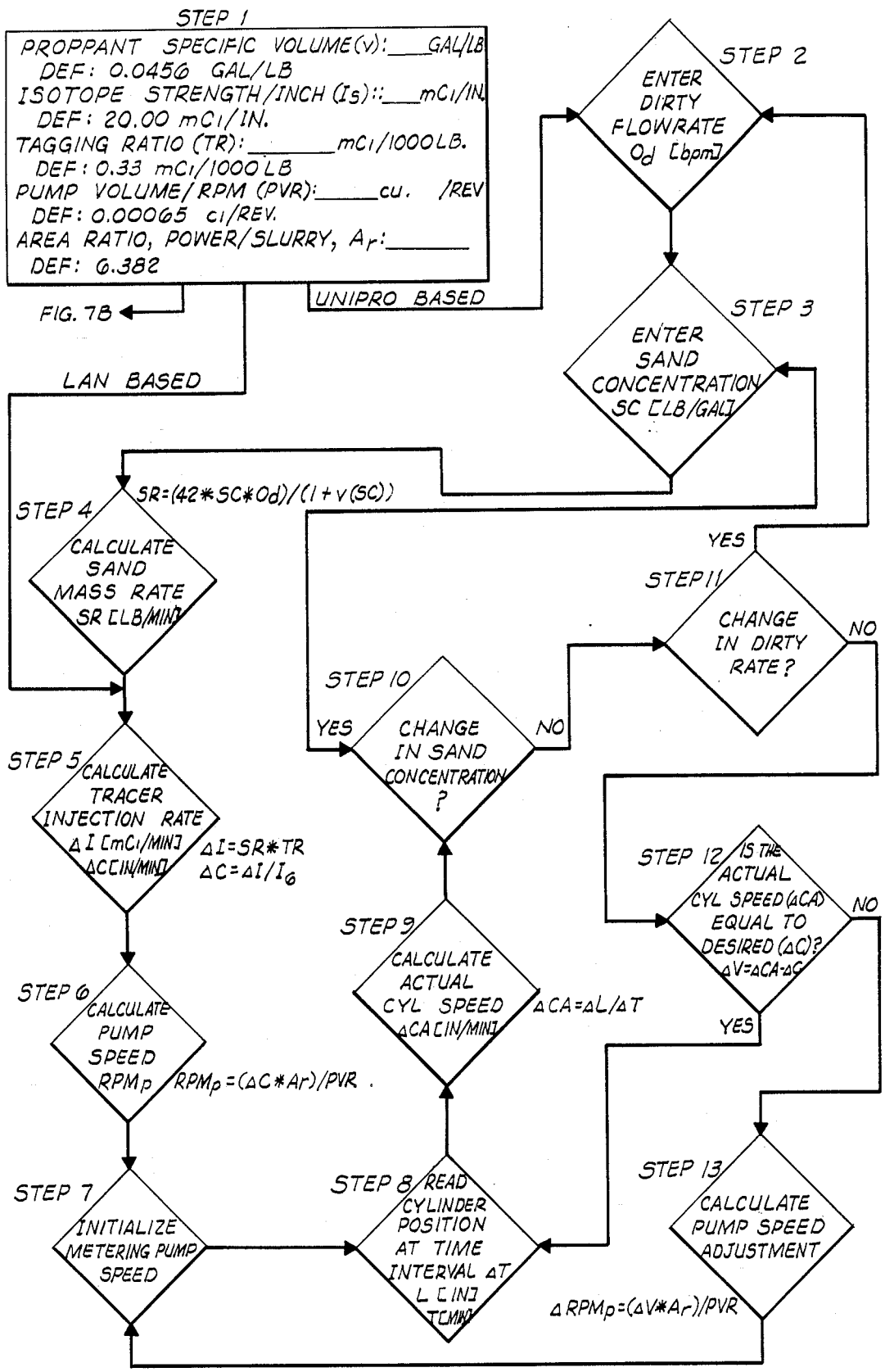

CLOSED FEEDBACK INJECTION SYSTEM FOR RADIOACTIVE MATERIALS USING A HIGH PRESSURE RADIOACTIVE SLURRY INJECTOR

BACKGROUND OF THE INVENTION

In the oilfield service industry and in particular, a stimulation operation such as a fracturing job, it is often desirable to "tag" a specific quantity of proppant with a radioactive substance prior to pumping the material down the well. Specifically, a radioactive slurry is injected into a high pressure well stimulation fluid line, such as a fracturing slurry line, or the like, having pressures in the range of 5,000 to 15,000 psi. Tagging allows data, such as the amount and extent of proppant placed in the formation, to be obtained. A syringe like injector device can be used to inject the radioactive substance into the fracturing slurry. A hydraulic cylinder is used and is connected to the syringe plunger, thus forcing the radioactive substance into the fracturing material. On many radioactive tagging jobs, the amount of radioactive slurry to be injected may remain constant for a period of hours and then be stepped up to a higher rate for another time period in a stair step type function. Normally, this would require an operator to manually reset the injection (displacement) rate, with the potential for operator error and a corresponding decrease in efficiency in each setting operation.

Injection systems have been used in the past, particularly, U.S. Pat. No. 3,228,472 to B. J. Rhoads, Jr. shows an automatic chemical injection apparatus for wells which uses a timer, electric motor, pump and chemical regulator to periodically inject a chemical treating agent downhole. U.S. Pat. No. 2,884,067 to A. S. Marken uses a tank with a float control means, a reservoir and a timing valve to introduce corrosion inhibitor down a well. Next, U.S. Pat. No. 4,659,925 to Burbridge et al shows a system for high pressure well injection of a radioisotope. A radioactive shielded vial, carrier fluid and evacuated chamber transfer a radioactive tracing material into a pressurized fluid system during a single injection operation. Additionally, U.S. Pat. No. 4,199,680 to Moon describes a method of treating and logging a well by introducing a radioactive tracer into the high pressure side of a fracturing fluid line by using a low volume, high pressure piston pump.

None of the above noted patents describe an injection system which allows for different desired injection rates to be automatically achieved. Therefore, a need exists for a device such as the present invention which will provide automatic, closed loop, constant feedback control of the injection rate of the radioactive material into a fracturing slurry, or the like.

SUMMARY OF THE INVENTION

The above noted shortcomings of the prior art are overcome by the present invention which includes an injection device, local power unit and a controller.

Broadly, the injection device includes a syringe like portion with a hydraulic cylinder mounted thereon. A piston rod of the hydraulic cylinder is connected to a plunger within the syringe. Thus, as the hydraulic cylinder is driven, the plunger is forced downward such that the volume of a syringe chamber is decreased and radioactive material is expelled from the chamber and injected into the fracturing slurry.

The driving unit, of the present invention, includes as its major components, a motor control unit, an electric motor and a hydraulic pump. The hydraulic pump drives the cylinder, which is part of the injection device, based upon the output of the electric motor. The motor control unit is used to vary the output of the electric motor, based upon commands input from the controller and thus controls the injection rate of the radioactive slurry.

A controller unit is provided which calculates the electric motor speed and thus the injection rate based upon known inputs such as pounds of sand (proppant) to be tagged, along with the desired injection rates. Additionally, the controller issues commands to the motor controller such that the injection rate which has been previously calculated is achieved.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 4 is a perspective view of the local power unit, illustrating the relationship of the components thereon and further showing the electric motor and hydraulic pump;

FIG. 5 is a schematic diagram showing the electrical wiring and hydraulic connections of a first embodiment of the present invention which utilizes a closed loop feedback control system;

FIG. 6 is a schematic diagram showing the electrical and hydraulic connections for a second embodiment of the present invention in which the radioactive slurry injection rate is manually controlled;

FIGS. 7a and 7b are flow charts which describe the operation of the controller used in the first embodiment of the present invention and depicted in FIG. 5;

DETAILED DESCRIPTION OF THE PREFERRED EMBODIMENTS

Figure 1:
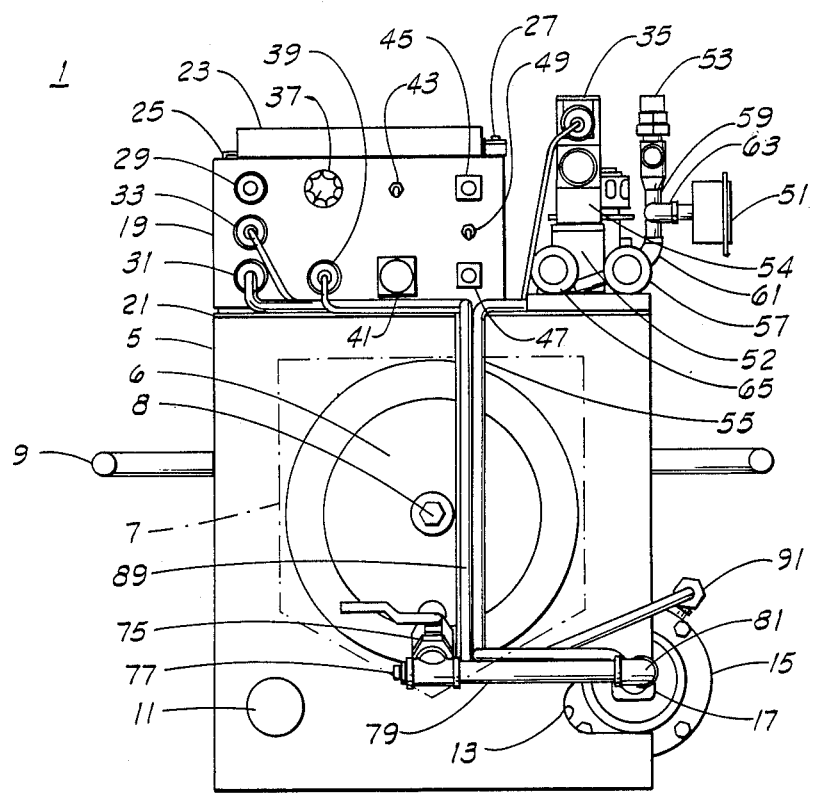
FIG. 1 is a front elevational view of the local power unit of the present invention.

Referring to FIG. 1, a front elevational view of a local power unit is shown and generally depicted by reference numeral 1. A housing 5, fabricated from sheet metal, or the like, functions to mount the various components of the local power unit 1, as described detail below.

A hydraulic fluid reservoir 7 provides a source of hydraulic fluid which will be required to drive an injection unit 2 (FIG. 5). Fluid reservoir 7 is configured as a polygonal tank and is disposed using a cover 6 and connectors 8, such as threadedly engaging bolts, clamps, or the like, at a center portion of housing 5. Handles 9 are provided which allow the local power unit 1 to be conveniently moved about. A hole 11 and slot 13 are defined within housing 5 allowing access to various components mounted thereon, such as an electric motor 15 and a hydraulic metering pump 17.

Next, a control box 19 is shown which is mounted on a plate 21 disposed on top of housing 5. Control box 19 includes a cover 23 with a hinge portion 25 and latch portion 27 thereon. Various motor control devices, described below, are interconnected and preset through a plurality of connection points and switches disposed on one side of control box 19.

Reference numeral 29 is an input point for receiving electrical power which ultimately drives electric motor 15. Motor output 31 supplies electric power to the motor 15, whereas valve output 33 supplies electric power to an electrically operated hydraulic directional valve 35. A pump speed control switch and pump RPM feedback input are designated by reference numerals 37 and 39, respectively. A control cable receptacle 41 is provided which interconnects a remote control unit 4 (FIG. 5) with the control devices located in control box 19. A three-way, manual/auto/off switch 43 is disposed on control box 19 for selecting the desired mode of operation. Local power unit 1 is capable of driving two injection units 2 and control cable inputs required for interconnection thereto are provided and labelled as reference numerals 45 and 47, respectively. A selection switch 49 allows operation of a single injection 2 unit or dual injection units 2.

Other components disposed on housing 5 of local power unit 1 and depicted in FIG. 1 include pump discharge line 55 which supplies pressurized hydraulic fluid to directional valve 35, which in turn provides hydraulic power to cylinder connection 57. A pressure gauge 51 is provided for determining the pressure of the hydraulic fluid output to injection unit 2. A pressure relief valve 53 is included which protects against potential damage to the present invention due to over pressure in the hydraulic fluid. Pressure relief valve 53 is affixed to directional valve 35 by a tee connector 59 and 90° ell 61. Pressure gauge 51 is also attached to tee connector 59 via 90° ell 63.

A one-directional check valve 54 is included which, under normal conditions, only allows hydraulic fluid to flow toward injection unit 2. Thus, if the injection process is halted, the operation can be restarted with the injection unit 2 at precisely the same position as when it was stopped. However, when the injection process is completed, hydraulic pressure is reduced so that the movement of injection unit 2 may be reversed. Also, during an emergency situation, directional valve 35 can apply pressure to check valve 54 causing it to open so that injection unit 2 can be retracted. Check valve 54 is physically disposed between a valve subplate 52 and directional valve 35 and is hydraulically placed within the discharge line from directional valve 35.

Hydraulic fluid is returned from injection unit 2 to the fluid reservoir 7 through quick retract coupler 65 and fluid line 67 (FIG. 2), which is connected to coupler 65 and a fluid reservoir fill cap 69 by hydraulic connectors 71 and 73 (FIG. 2), respectively.

Hydraulic connections between cylinder connection 57 and quick retract coupler 65, and injection units are made in a manner known in the art, such as high pressure flexible hydraulic lines having pressed connectors thereon.

A fluid reservoir valve 75 is provided which allows for disconnection of the hydraulic fluid supply to hydraulic meter pump 17 A tee connector 77, pipe 79 and 90° ell 81 provide a hydraulic fluid passageway to a suction line 83 (FIG. 4), which is connected to 90° ell 81 and metering pump 17 by connectors 85 and 87 (FIG. 4), respectively. A motor control cable 89 is provided which connected motor output 31 to motor 15, through a connector 91.

Figure 2:
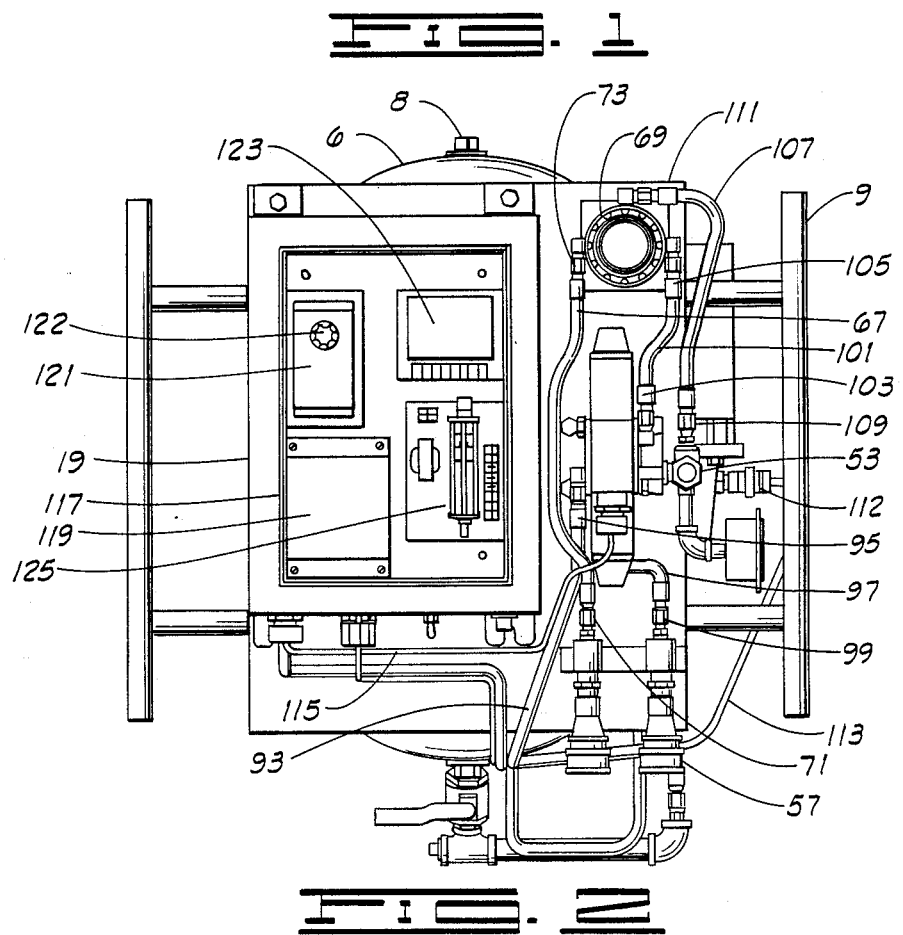
FIG. 2 is a top plan view of the local power unit of FIG. 1, showing various components of the electric motor control unit, which are mounted thereon.

Next, the local power unit 1 will be described with reference to FIG. 2.

Discharge line 93 and connector 95 provide hydraulic fluid from pump 17 to directional valve 35 and check valve 54. Line 97 and connector 99 supplies the fluid to cylinder connection 57 which is then provided to injection unit 2 (FIG. 5). A fluid line 101 and connectors 103, 105 provide a fluid return path from direction valve 35 to reservoir 7. Similarly, relief line 107 and connectors 109, 111 provide a fluid path from pressure relief valve 53 to reservoir 7 for hydraulic fluid which is present during an over pressure situation.

Pump 17 rotational speed (RPM) is provided as a feedback signal to the control box 19 from magnetic pickup 112 via cable 113 (also see FIG. 4). Electrical control from control box 19 to directional valve 35 is transmitted by a cable 115. Control box 19 includes control devices which make up the motor control unit which is depicted by reference numeral 117. A signal conditioner 119, motor speed controller 121, DC/DC converter 123 and motor controller signal card 125 are disposed within control box 19. The operation of these devices will be discussed in conjunction with FIGS. 5 and 8 below.

Figure 3:
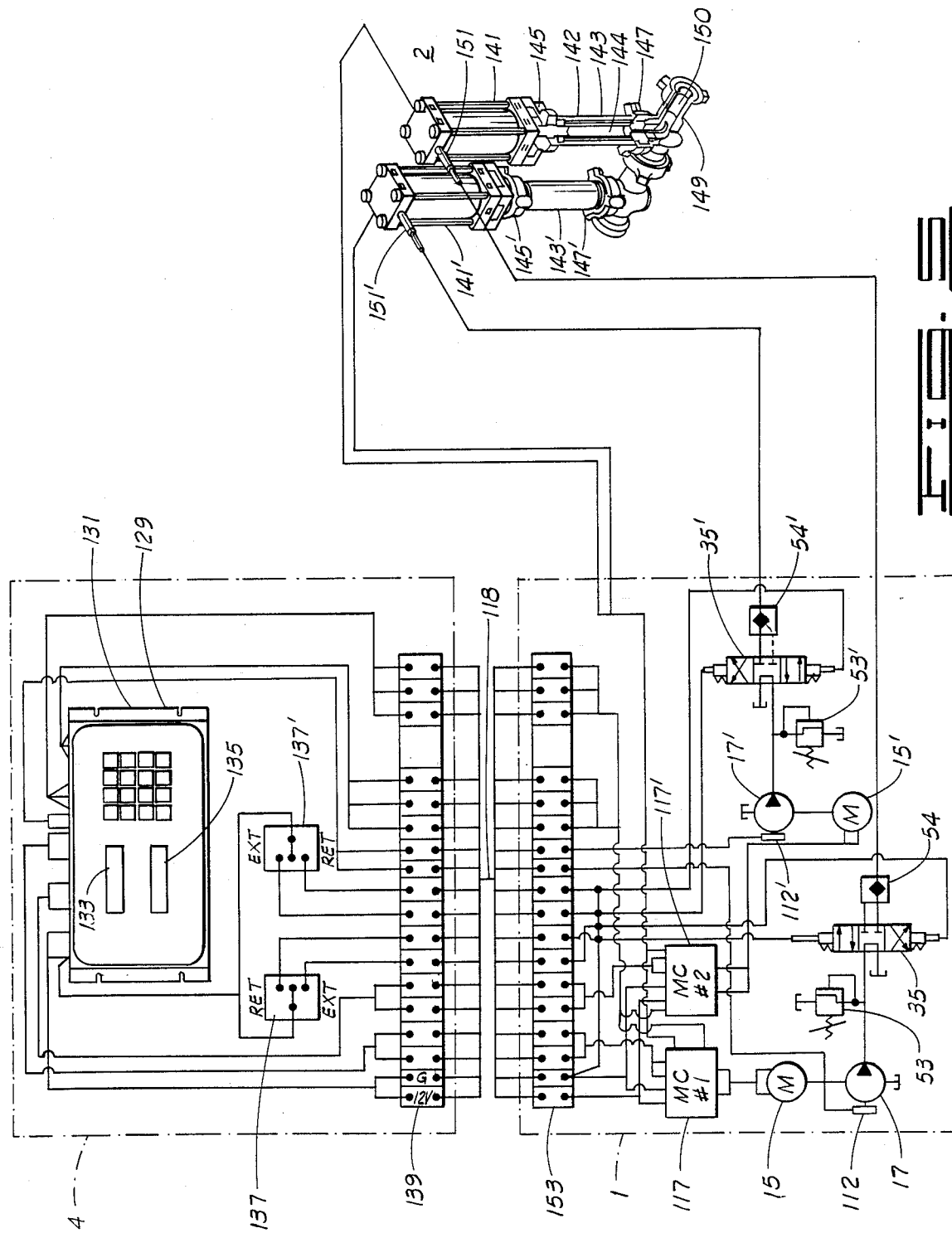
FIG. 3 is a perspective view of the local power unit, illustrating the hydraulic and electrical interconnections and the relationship of the components disposed thereon.

FIGS. 3 and 4 are perspective views of local power unit 1 which illustrate the relationship and interconnection between the components thereon. In particular, FIG. 4 shows the attachment of motor 15 and pump 17 to housing 5 and the connections to motor 15 and pump 17. Adapter 127 is utilized to connect electric motor 15 to metering pump 17 and provides magnetic pickup 112 which supplies the pump RPM feedback signal to control box 19.

Local power unit 1, injection unit 2 and controller 4, and the interconnections therebetween are schematically shown in FIG. 5. Dual injection units 2 and the components of two local power units 1 are depicted in FIG. 5. However, since two systems operate in exactly the same manner as a single system, a description of a system having a single injection unit 2 is included herein. Dual systems are useful under conditions when a large quantity, or different types of radioactive tagging material is to be injected.

The operation of the automatic injection rate control system will now be described in conjunction with FIGS. 5 and 8. Controller 4 includes a central processing unit 129, such as is commercially available, or in this case such as is described in U.S. Pat. No. 4,747,060 to Sears III et al and assigned to the assignee of the present invention. A keypad 131 and display units 133 and 135 are included in CPU 129. Additionally, controller 4 includes manual switches 137, 137' and a terminal board 139. Initially, data is entered to CPU 129 and may include radioactive source strength per inch, radioactive source length, total radioactive source per 1000 pounds, sand concentration, dirty downhole rate (fracturing slurry rate). CPU 129 then calculates an initial RPM for the pump 17 in order to achieve the calculated desired injection rate. Switch 137 is used to start the injection process by selecting the extend position. The retract position is used only in emergency situations during a job, or when a job has been completed. Interconnection between controller 4, which is remotely located in a fracturing van, or other job control center, and local power unit 1 is achieved by an electrical cable 118.

After the extend position has been selected, CPU 129 issues a command to the motor control unit 117, 117' which drives electric motor 15, 15' and thus pump 17, 17' based upon the previously calculated injection rate. At this point, the operation is an open loop system. CPU 129 uses the pump RPM feedback signal, from magnetic pickup 112, 1121 which is proportional to the volumetric discharge rate of pump 17, to initially check the actual injection rate against the calculated injection rate.

Injection unit 2, basically includes a hydraulic cylinder 141, 141' and radioactive slurry syringe 143, 143' having a chamber 144 therein. Interconnection means 145, 145' are included for connecting hydraulic cylinder 141 to syringe 143. Fracture slurry line connector means 147, 147' are utilized for connecting syringe 143 to high pressure fracturing slurry line 149 such that chamber 144 is in communication with an inner surface 150 of fracturing slurry line 149. Injection unit 2 is capable of injecting radioactive slurry into a fracture slurry line 149 wherein pressures of up to 15,000 psi are present. An injection unit 2 suitable for use in the present invention is described in U.S. patent application Ser. No. 919,750, filed on Oct. 10, 1986 and assigned to the assignee of the present application now U.S. Pat. No. 4,786,805.

Hydraulic cylinder 141 includes a plunger 142 (FIG. 5) which is insertable into chamber 144. Further, position feedback means 151, 151' is provided for detecting and outputting the position, and thus the movement of the plunger 142. In this manner, the injection rate of the radioactive slurry into the fracturing line 149 can be determined.

More particularly, feedback means 151 includes a resistive strip which is basically a potentiometer that varies the resistance experienced by a voltage signal input, or signal conditioner 119, from CPU 129 based upon the movement of cylinder 141. The position feedback signal supplied to CPU 129 is proportional to the amount of resistance experienced by the input voltage signal. Thus, the position of cylinder 141 can be determined by CPU 129 based upon the position feedback signal voltage level. For example, a 10 volt, 1 milliamp input from CPU 129 and a 10K ohm per inch potentiometer would result in a one volt drop for each inch travelled by cylinder 141. Therefore, a 9 volt position feedback signal would indicate cylinder movement of one inch and the actual radioactive slurry injection rate can be determined.

As previously stated, an open loop control system is initiated. However, once movement of hydraulic cylinder 141 begins, the control system is transformed into a closed loop feedback system. Movement of cylinder 141 causes CPU 129 to control the position movement of cylinder 141 by monitoring the feedback signal output by position feedback means 151. Signal conditioner 119 (FIG. 8), such as a Model 5025 Signal Conditioner which is commercially available from Hydroline Manufacturing, transforms the position feedback signal into a form which is compatible with CPU 129. The position feedback signal is then output from local power unit 1 through a terminal board 153 to terminal board 139 of controller 4 and is then input to CPU 129.

Next, CPU 129 calculates the actual hydraulic cylinder 141 velocity and thus the injection rate by monitoring the feedback position signal over a sample period of time. A proportional integral derivative (PID) algorithm is then used which compares the actual injection rate with the previously calculated desired injection rate. CPU 129 will vary the command which is output to motor control unit 117 until the difference between the desired injection rate and the actual injection rate is equal to zero.

Additionally, CPU 129 will display the total amount of radioactive slurry injected (milli curies) and the injection rate (milli curies per minute) on displays 133 and 135, respectively.

The processing of the electrical command signal issued by CPU 129 and the subsequent implementation of this electrical command signal into a hydraulic drive signal having a variable pressure and flow rate which is issued to hydraulic cylinder 141 is performed by the local power unit 1, the operation of which will now be described with reference to FIGS. 5 and 8.

First, switch 137 emits an electrical signal to directional valve 35. When the extended position is selected, directional valve 35 is operated such that hydraulic fluid is allowed to flow towards hydraulic cylinder 141. Conversely, when the retract position is selected an electrical signal operates valve 35, which opens check valve 54, to allow fluid flow in a direction away from hydraulic cylinder 141 and toward reservoir 7.

Figure 8:
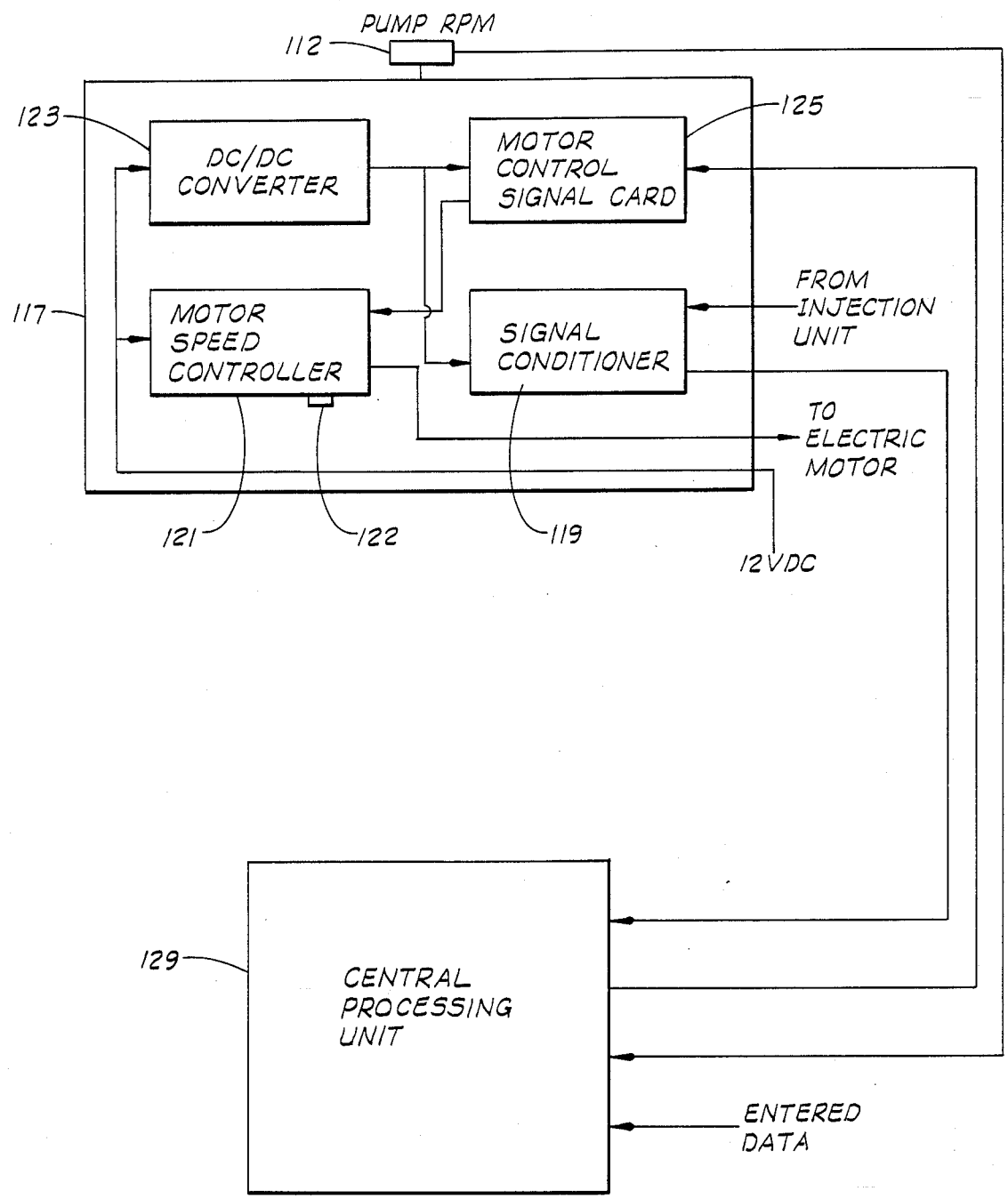
FIG. 8 is a block diagram illustrating the interconnection between the controller and the components of the motor control unit of the first embodiment of the present invention.

FIG. 8 is a block diagram which shows the motor control unit 117 with its individual components disposed therein. CPU 129 issues an electrical command signal, to motor control unit 117, based upon calculated entered data or the PID algorithm, which varies in a range from 0-5 vdc or 1-10 vdc. More particularly, this command signal is input to motor control signal card 125 which is essentially a motorized potentiometer which determines the particular voltage at a given time from the voltages input from the CPU 129 command signal. Signal card 125 then outputs this determined voltage to motor speed controller 121. A suitable motor control signal card 125 for this application is a commercially available Position Control Card manufactured by ETI Systems. Signal card 125 and signal conditioner 119 both require a voltage level of approximately 15 vdc which is provided by DC/DC converter 123, such as is manufactured by Intronics, which receives 12 vdc and outputs 15 vdc for powering the aforementioned devices.

Motor speed controller 121 is commercially available as a Motor Control Unit manufactured by Marlin Controls and receives the voltage input from signal card 125 and outputs a 12 vdc pulse width modulated (PWM) signal to motor 15, which is a 12 vdc electric motor. The width of the 12 vdc pulse controls the speed of electric motor 15 which in turn is mechanically coupled to pump 17, through adapter 127. Therefore, CPU 129 controls pump 17 and thus the radioactive slurry injection rate based upon a PID algorithm which utilizes the actual injection rate and desired calculated injection rate as its parameters.

Additionally, a manual control feature is present in the first embodiment of the present invention wherein a manually operated potentiometer 122 is included on motor speed controller 121 which allows the pump speed and thus the injection rate to be varied locally from power unit 1.

Further, CPU 129 can automatically increase the injection rate in a multiple stage job. For example, additional proppant may need to be added to a fracturing job after a set period of time. In order to compensate for the increased proppant, the speed of pump 17 will need to be increased in order to maintain the desired level of radioactive source strength per 1000 pounds of proppant, or per barrel of liquid. Therefore, a stair step type stimulation job can be entered into CPU 129 and automatic adjustment will be implemented. It should be noted that the RPM feedback from pump 17 will be utilized at each point where the injection rate changes in order to initialize the new desired injection rate with respect to the calculated speed of pump 17.

A second embodiment of the present invention is illustrated in FIG. 6 and will be described in conjunction therewith. Local power unit 300 is placed in close proximity to injection unit 2 (which is identical in operation and structure to injection unit 2 of the first embodiment). A 12 volt dc hydraulic metering pump 302 is provided and interconnected with a fluid reservoir in a manner similar to FIG. 1. In this embodiment, pump 302 is incapable of providing the pressure level required to inject the radioactive slurry into a high pressure fracturing line. Therefore, a pneumatic pump 312 is utilized in this embodiment which will boost the pressure level of the hydraulic fluid. It should be noted that local power unit 300 will differ from local power unit 1, of the first embodiment, in that no motor control unit 117 is present and additional components, including pneumatic pump 312, are provided.

Hydraulic relief valves 304, 306 are used to provide protection against over pressure in the hydraulic lines. Valve 304 is rated to protect metering pump 302, wherein valve 306 is used to protect the hydraulic system after air pump 312 has increased the fluid pressure (i.e. valve 306 is rated for higher pressure than valve 304). An electrically operated directional valve 308 operates similarly to the directional valve 35 of the first embodiment in that a switch 320 when placed in the extend position, operates valve 308 so that fluid may flow toward injection unit 2, thus extending hydraulic cylinder 141. Conversely, selecting the retract position reverses the direction of valve 308 allowing fluid to flow away from injection unit 2 such that cylinder 141 can be retracted. Electrical signals from switch 320 are input to local unit 300 through a terminal board 303.

Air pressure is input to a regulator 310 for filtering and regulating the pneumatic power input to pump 312. Next, an electrically operated pneumatic control valve 311 is provided which allows the system to be automatically shut down in over pressure situations, or the like. Pneumatic pressure is prevented, by valve 311, from reaching air pump 312, thus preventing the continuous dumping of hydraulic fluid through relief valve 306 during an over pressure situation.

The hydraulic fluid volumetric discharge rate is a function of the pneumatic pressure, volumetric rate of the metering pump 302 and the discharge pressure. In the system of FIG. 6, pneumatic pressure and the volumetric rate of metering pump 302 are controllable. However, under normal operating conditions, a constant pneumatic pressure will be applied and the system will be controlled by varying only the volumetric rate of metering pump 302, as described below.

A control unit 314 is provided for controlling the injection rate and may be used locally, or may be remotely connected to local unit 300 by a cable 316 and located in a frac van, or the like. Electric power is provided from a 12 vdc source and input through a terminal board 318. Switch 322 allows for operation of pneumatic control valve 311 in over pressure situations or the like, as previously discussed. The operation of switch 320 has been previously described in conjunction with directional valve 308.

The volumetric rate of metering pump 302 is a function of input voltage which can be in the range of 1–12 vdc (12 v being the maximum volumetric rate and 1 v being the minimum volumetric rate). Rheostats 324 and 326 are rated at approximately 25 ohms and 2 ohms respectively, and operate to vary the 12 vdc input such that a control signal in the range of 1–12 vdc is output to metering pump 302, thus controlling the injection rate of the radioactive slurry. Rheostat 324 is rated at 25 ohms such that a course adjustment feature is provided, whereas rheostat 326 is rated at 2 ohms and provides a fine adjustment.

Feedback information is provided by position feedback means 151, as discussed in conjunction with the first embodiment, and shown on cylinder displacement display 328. A signal conditioner 334, which is identical to the signal conditioner 119 utilized in the first embodiment, transforms the position feedback signal into a form compatible with cylinder displacement display 328. Pump voltage display 330 exhibits the voltage impressed upon metering pump 302, based upon the setting of rheostats 324, 326. In addition to providing an output signal to metering pump 302, rheostats 324, 326 provide the output voltage level to pump voltage display 330 by way of a parallel connection. DC/DC converter 332 is identical to DC/DC converter 123 and provides the 15 vdc operating power to signal conditioner 334 in the same manner described in conjunction with the first embodiment. DC/DC converter 332 and signal conditioner 334 also provide termination points through which the required 12 vdc power is supplied to pump voltage display 330.

Therefore, in the second embodiment of the present invention, an operator (either locally or remotely) can control the radioactive slurry injection rate by adjusting the voltage impressed on metering pump 302. Additionally, this control can be achieved by utilizing the displayed cylinder displacement and pump voltage feedback information in addition to the predetermined job characteristics.

Figure 7A:
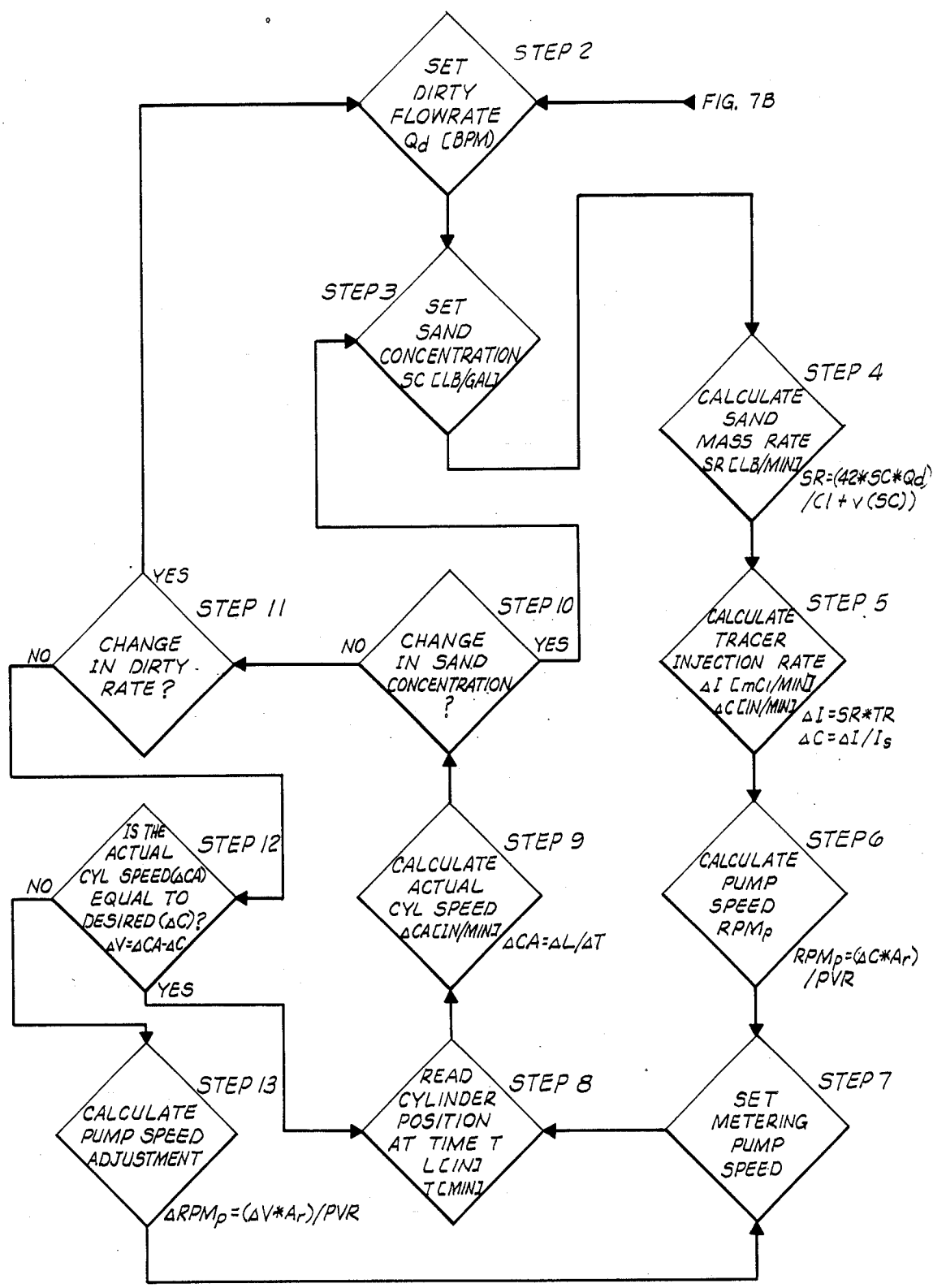

Referring again to the first embodiment of the present invention, in order for CPU 129 to control the radioactive slurry injection rate, a series of calculations must be performed and several determinations must be made which are illustrated in the flow chart of FIGS. 7a and 7b. It should be noted that manual control of the radioactive slurry injection operation is shown in FIG. 7a and requires the operator to perform the same calculations and make the same determinations as CPU 129. Therefore, the following description will apply to either manual, or processor controlled operation.

Initially, at step 1, job characteristics such as proppant specific volume (v), radioactive isotope strength (Is), tagging ratio (TR), pump volume per RPM (PVR) and area ratio, i.e. power slurry versus slurry chamber area (Ar) are determined. At step 2, the dirty flowrate (rate of proppant slurry downhole) is entered into CPU 129. Next, the sand concentration is entered at step 3, and step 4 calculates the sand mass rate in pounds per minute. Thereafter radioactive tracer injection rate and metering pump speed are calculated at steps 5 and 6, respectively.

At step 7, CPU 129 initializes the metering pump speed, based upon the previous calculations. The position of the injection cylinder is read for a given time interval, at step 8, and step 9 calculates the actual injection cylinder speed in inches per minute.

A designed stimulation job will often call for a change in proppant concentration, or downhole fluid rate after a given time period. The present invention will automatically change the radioactive slurry injection rate to correspond with the designed stimulation job parameters. Step 10 determines whether a change in sand concentration is called for. If so, the system goes to step 3, where the new sand concentration value is entered and the system repeats steps 3-10 for the new sand concentration value. If a new sand concentration value is not called for, the system proceeds to step 11 where it is determined whether a change in the dirty downhole rate is called for. If so, the new dirty rate is entered at step 2 and the system repeats steps 2-10 using the new dirty downhole rate.

If no new dirty rate is called for at step 11, the system proceeds to step 12 where it is determined if the actual injection cylinder speed is equal to the desired cylinder speed. If the actual and desired speed are equal, the system goes to step 8 where the cylinder position is read and then to step 9 where the actual cylinder speed is calculated. If the actual cylinder speed does not equal the desired cylinder speed, the system proceeds to step 13 where a metering pump speed adjustment is calculated. Next, the system returns to step 7 where the metering pump speed is initialized, according to the calculated pump speed adjustment. Step 7 originally initializes pump speed based upon entered data and a series of calculations which are used to obtain a desired rate. At this point, CPU 129 also uses the RPM feedback to ensure that the desired pump speed is actually achieved. After the cylinder position is read and the system becomes closed loop (steps 8-13), step 7 initializes pump speed based upon the actual pump speed and whether desired pump speed is equal thereto.

Therefore, it can be seen that an initialization control loop is formed through steps 2-11 wherein the desired pump speed is initialized depending upon job characteristics and any desired changes therein. Additionally, a feedback control loop is formed through steps 7-13 wherein the metering pump speed is adjusted until the actual pump speed is equal to the desired pump speed, i.e. actual injection rate equals desired injection rate.

The control system described by the first embodiment of the present invention is compatible with a local area network (LAN) based system, such as is disclosed in U.S. Pat. No. 4,751,648 to Sears III et al issued on June 14, 1988 and assigned to the assignee of the present invention. When used in conjunction with a LAN system, the CPU 129 can begin control operations at step 5 by calculating the radioactive tracer injection rate. The job data (step 1), dirty flow rate (step 2), and sand concentration (step 3) have previously been entered into the LAN system which then calculates the sand mass rate (step 4). Therefore, steps 1-4 can be bypassed when the present invention is used in conjunction with a LAN control system.

Although certain preferred embodiments have been shown and described, it should be understood that many changes and modifications may be made therein without departing from the scope of the appended claims.

What is claimed is:

1. A slurry injection system, comprising:

injection means for injecting a volume of the slurry at a predetermined rate, and for providing a feedback signal based upon said volume of slurry which has been injected;

local power means for providing a driving force to said injection means; and control means for controlling an injection rate of said volume of slurry.

2. An injection system according to claim 1 wherein said control means includes:

central processing means for calculating said predetermined injection rate, and for providing a control signal to said local power means based upon said predetermined rate and said feedback signal, said control signal includes a range of voltages from one of 0-5 volts dc and 1-10 volts dc; and means for providing a communication path between said control means and said local power means.

3. An injection system according to claim 2 wherein said local power means includes:

a variable speed electric motor;

a hydraulic pump, operatively connected to said electric motor;

sensing means for measuring a rotational speed of said hydraulic pump, and for outputting a signal based upon said measured speed; and motor control means for issuing a speed command to said electric motor, varying in accordance with said control signal received from said central processing means.

4. An injection system according to claim 3 wherein said injection means includes:

a syringe having a chamber for holding the slurry therein; and a hydraulically operated cylinder having a plunger mounted on one end thereof;

said plunger being insertable into said chamber for displacing the slurry therefrom.

5. An injection system according to claim 4 wherein said injection means includes feedback means for outputting said feedback signal based upon a position of said plunger within said chamber.

6. An injection system according to claim 5 wherein said local power means further includes:

an electrically operated hydraulic directional valve which allows hydraulic fluid of a predetermined pressure to flow from said hydraulic pump in one of a direction towards said hydraulic cylinder and away from said hydraulic cylinder;

a pressure relief valve which provides an outlet for hydraulic fluid having a pressure exceeding said predetermined pressure; and a check valve which maintains a hydraulic fluid pressure as applied to said hydraulic cylinder if said slurry injection is halted.

7. An injection system according to claim 6 wherein said local power means further includes:

a terminal board which provides an interconnection point between said control means and said local power means;

a housing including a hydraulic fluid reservoir disposed therein.

8. An apparatus according to claim 4 wherein said control means further includes:

switch means for manually controlling the direction of movement of said hydraulic cylinder;

a terminal board which provides an interconnection point between said control means and said local power means; and display means for illustrating a slurry injection rate and a total volume of slurry injected.

9. An injection system according to claim 3 wherein said motor control means includes:

signal conditioning means for changing said feedback signal into a form compatible for input to said central processing means;

control signal card means for determining a particular voltage within said range of voltages of said control signal, and for outputting said determined voltage;

motor speed control means for receiving said determined voltage, and for outputting said speed command to said electric motor based upon said determined voltage; and converting means for transforming a first voltage having a first voltage level to a second voltage having a second voltage level, and for outputting said second voltage to said signal conditioning means and said control signal card means.

10. An injection system according to claim 9 wherein said motor speed control means includes manual control means for manually varying said speed command being output to said electric motor and thereby the rotational speed thereof.

11. An injection system according to claim 3 wherein said speed command issued to said electric motor is of a constant voltage and a modulated pulse width.

12. A system for radioactively tagging a well stimulation fluid, by injecting a radioactive slurry into the stimulation fluid prior to pumping the stimulation fluid down a wellbore, said system comprising:

an injection unit including:

a syringe having a chamber for holding the radioactive slurry therein:

a hydraulically operated cylinder having a plunger disposed on an end thereof, said plunger being insertable into said chamber for displacing said radioactive slurry therefrom; and a position sensor which senses a position of said plunger within said chamber and outputs a feedback signal based thereon; a local power unit including:

a variable speed electric motor;

a hydraulic pump operatively connected to said electric motor;

a rotation sensor which senses a rotational speed of said hydraulic pump and outputs a rotational speed signal based thereon; and a motor control unit which issues a varying speed command to said electric motor; and a controller including a central processing unit which calculates an initial injection rate and issues a control signal, having a variable voltage, varying in accordance with said feedback signal and said rotational speed signal, said electric motor varying its speed in accordance with said control signal received by said motor control unit from said central processing unit.

13. A system according to claim 12 wherein said local power unit further includes:

an electrically operated hydraulic directional valve which allows hydraulic fluid, of a predetermined pressure level, to flow from said hydraulic pump in one of a direction toward said hydraulic cylinder and a direction away from said hydraulic cylinder;

a pressure relief valve which provides an outlet for hydraulic fluid having a pressure greater than said predetermined pressure; and a check valve which maintains a hydraulic fluid pressure as applied to said hydraulic cylinder if said radioactive slurry injection is halted.

14. A system according to claim 13, wherein said motor control unit includes:

a signal conditioner which changes said feedback signal into a form compatible for input to said central processing unit;

a control signal card which determines a particular voltage from said variable voltage control signal, and outputs said determined voltage;

a motor speed control unit which receives said determined voltage and outputs said speed command to said electric motor based upon said determined voltage; and a converter which transforms a first voltage having a first voltage level to a second voltage having a second voltage level and outputs said second voltage to said signal conditioner and to said control signal card.

15. An system according to claim 14 wherein said motor speed control unit includes a manual speed control device which allows the speed command being output to said electric motor to be manually varied thereby controlling the rotational speed thereof.

16. A system according to claim 13 wherein said controller further includes:

a switch for electrically operating said hydraulic directional valve;

a first display for illustrating an injection rate of said radioactive slurry;

a second display for illustrating a total volume of radioactive slurry injected; and a cable for connecting said local power unit and said controller thereby providing electrical communication therebetween.

17. A system for radioactively tagging a well stimulation fluid, having a pressure greater than a predetermined level, by injecting a radioactive slurry into the stimulation fluid prior to pumping said stimulation down a wellbore, said system comprising:

injection means for injecting a volume of the radioactive slurry at a predetermined rate, and for providing a feedback signal based upon said volume of slurry which has been displaced;

local power means for providing a driving force to said injection means;

manual control means for setting said predetermined injection rate, and for manually controlling said injection rate based upon said feedback signal; and cable means for providing a communication path between said manual control means and said local power means.

18. A system according to claim 17 wherein said injection means includes:

a syringe having a chamber for holding the radioactive slurry therein;

a hydraulically operated cylinder having a plunger mounted on one end thereof, said plunger being insertable into said chamber for displacing the radioactive slurry therefrom; and a position sensor which senses a position of said plunger within said chamber and outputs said feedback signal based thereon.

19. A system according to claim 18 wherein said local power means includes:
   an electrically operated hydraulic metering pump, having a rotational speed varying in accordance with a voltage impressed thereon, which provides hydraulic fluid at a predetermined pressure level;
   an electrically operated hydraulic directional valve which allows said hydraulic fluid to flow from said metering pump in one of a direction towards said hydraulic cylinder and a direction away from said hydraulic cylinder; and
   an electrically controlled pneumatic pump in communication with said hydraulic fluid which increases a pressure of said hydraulic fluid to a level greater than said predetermined level.

20. A system according to claim 19 wherein said manual control means includes:
   a first switch for operating said pneumatic pump;
   a second switch for operating said directional valve;
   a first manually operated rheostat for varying said voltage impressed upon said metering pump within a first range of voltage values;
   a second manually operated rheostat for varying said voltage impressed upon said metering pump within a second range of voltage values;
   a first display which illustrates sid voltage which is being impressed upon said metering pump; and
   a second display which illustrates the total volume of radioactive slurry injected.

* * * * *